United States Patent
Oh

(10) Patent No.: US 7,800,414 B2
(45) Date of Patent: Sep. 21, 2010

(54) DIFFERENTIAL CURRENT DRIVING TYPE DATA TRANSMISSION SYSTEM

(75) Inventor: Woon-Taek Oh, Cheongju-si (KR)

(73) Assignee: Magnachip Semiconductor Ltd., Cheongju-si (KR)

( * ) Notice: Subject to any disclaimer, the term of this patent is extended or adjusted under 35 U.S.C. 154(b) by 0 days.

(21) Appl. No.: 12/209,804

(22) Filed: Sep. 12, 2008

(65) Prior Publication Data

US 2010/0066418 A1 Mar. 18, 2010

(51) Int. Cl.
*H03B 1/00* (2006.01)
(52) U.S. Cl. .................................... 327/108
(58) Field of Classification Search .......... 327/108–112
See application file for complete search history.

(56) References Cited

FOREIGN PATENT DOCUMENTS

| JP | 11-289355 | 10/1999 |
|----|-----------|---------|
| JP | 2004-253859 | 9/2004 |
| JP | 2005-191864 | 7/2005 |
| JP | 2005-260799 | 9/2005 |
| KR | 10-0588752 | 6/2006 |
| KR | 10-2008-0058631 | 6/2008 |

OTHER PUBLICATIONS

Notice of Allowance issued in counterpart Korean Application No. 10-2006-0132527, mailed Sep. 29, 2008.
English translation of Notice of Allowance issued in counterpart Korean Application No. 10-2006-0132527, mailed Sep. 29, 2008.
English langauge abstract of JP 2005-260799, published Sep. 22, 2005.
Machine English langauge translation of JP 2005-260799, published Sep. 22, 2005.
English langauge abstract of JP 11-289355, published Oct. 19, 1999.
Machine English langauge translation of JP 11-289355, published Oct. 19, 1999.
English langauge abstract of JP 2005-191864, published Jul. 14, 2005.
Machine English langauge translation of JP 2005-191864, published Jul. 14, 2005.
English language abstract of KR 10-0588752, published Jun. 2, 2006.
English language abstract of JP 2004-253859, published Sep. 9, 2004.
Machine English language translation of JP 2004-253859, published Sep. 9, 2004.

*Primary Examiner*—Lincoln Donovan
*Assistant Examiner*—William Hernandez
(74) *Attorney, Agent, or Firm*—DLA Piper LLP US

(57) ABSTRACT

A differential current driving type data transmission system includes a line drive controller for outputting differential transmission signals and common mode line control signals, in response to a transmission signal; current sources for generating an excitation current and a base current and for driving positive/negative transmission lines with the base current; a first switch for selectively switching the excitation current to the positive/negative transmission lines, in response to the differential transmission signals; and a second switch for equalizing the positive/negative transmission lines within a common mode interval, in response to the common mode line control signals, wherein, in the common mode, the positive/negative transmission lines are driven at a level above or below an intermediate current level by a predetermined common mode current difference.

9 Claims, 6 Drawing Sheets

DIFFERENTIAL CURRENT DRIVING TYPE DATA TRANSMISSION SYSTEM

BACKGROUND OF THE INVENTION

The present invention relates to a technology for electronic circuits; and more particularly, to a differential current driving type data transmission system.

In general, a differential current driving type data transmission system, supplies different currents to two signal lines in open drain ways, so that a receiving end can recover an original signal based on a voltage difference inputted thereto.

However, concerns arise in such a different current driving type data transmission system in that the effects of an interference phenomenon and noises between transmission lines become stronger as R, L, and C components that are parasitic on the transmission line increase. These concerns are led to the serious distortion of a transmission signal and the lengthy transition time of the signal, which contribute to a reduction in the transmission rate. Moreover, in order to recover an original signal from the distorted signal at the receiving end, complex circuits such as an amplifier should be provided additionally. This naturally increases the complexity of the overall circuit, and the error rate of the system itself during the signal recovery gets higher.

Nevertheless, the distortion of a transmission line due to noises is significantly lower in the differential current driving type than in the single current driving type using one signal line to transmit signals. This is because the influence of noise on differential signal lines is almost the same, so the voltage difference lastly inputted to the receiving end is not much affected by noise. On the contrary, interference between transmission lines differentially influences depending on a distance between signal lines, i.e., the closer the signal lines are to each other, the interference is stronger in proportional to the distance therebetween. As such, the voltage difference of a signal lastly inputted to the receiving end is under the influence of the interference effect, which makes very difficult for the receiving end to recover an original signal.

One general way to resolve such a concern is to increase an amount of current to be supplied in consideration of a possible occurrence of signal distortion due to the noise during signal transmission and the interference between signal lines. When more current is supplied, a voltage difference, between two input signals at the receiving end becomes greater, thereby lowering an error rate in the recovery of an original signal. Although an increase in the amount of current supplied to the transmission line can minimize the distortions of signal, this needs more power and in turn may cause another problem such as an increase in Electromagnetic Interference (EMI) between transmission lines.

In view of such a problem, the inventors of the present invention have proposed, in Korean Patent Application No. 2005-34614 filed on Apr. 26, 2005, a scheme for reducing an error rate in the recovery of an original signal at the receiving end, without necessarily supplying more current to the transmission line as in the existing differential current driving type data transmission system.

The conventional differential current driving type data transmission system includes a transmission section 100, a transmission line 200, and a receiving section 300, as shown in FIG. 1 (see Korean Patent Application No. 2005-34614).

The transmission section 100 includes a line drive controller for outputting differential transmission signals D+ and D− and a line control signal NT, in response to a transmission signal D; and a line driver for driving transmission lines TX+ and TX− with an excitation current source Idc and a base current source Icc, in response to an output signal from the line drive controller.

The receiving section 300 includes an I-V converter for converting transmission currents Irx+ and Irx− that are transmitted through the transmission line 200 into voltage signals Vd+ and Vd−; and a comparator for comparing the voltage signals Vd+ and Vd− to recover an original signal Dr therefrom.

FIG. 2 shows a timing diagram of signals used in the line drive controller of FIG. 1. A line control signal NT in FIG. 2 detects the transition of a transmission signal D such that it becomes inactive in a half period of the unit pulse width of the transmission signal D and becomes active in the other half period.

FIG. 3 illustrates a circuit diagram of the line driver of FIG. 1.

Referring to FIG. 3, the line driver includes transistors TR-1, TR2, TR3 and TR4 for and generating an excitation current source Idc and a base current source Icc by mirroring a reference current Iref; transmission gates TR5, TR6, TR7 and TR8 constituting a first switch SW0 for selectively switching the excitation current source Idc to differential transmission lines TX+ and TX−, in response to differential transmission signals D+ and D−; and transmission gates TR9 and TR10 constituting a second switch SW1 for equalizing the differential transmission lines TX+ and TX− within a common mode interval, in response to line control signals NT+ and NT−.

FIG. 4 depicts a timing diagram of signals used in the line driver in FIG. 3, in which the line control signal NT is inactive in a half period (PT/2) of the unit pulse width PT of the transmission signal D and stays in active until the next transition point of the transmission signal D, such that the differential transmission lines TX+ and TX− in the first half period are driven at Icc, Icc+ and Idc levels depending on the polarity of the transmission signal D and they are equalized at the (2Icc+Idc)/2 level until the next transition point of the transmission signal D, i.e., during the common mode interval.

FIG. 5 illustrates a circuit diagram of the I-V converter in FIG. 1.

Referring to FIG. 5, the I-V converter includes current mirrors 42 and 44 for generating mirroring currents MxIRx+ and MxIrx− by mirroring the transmission currents Irx+ and Irx− flowing through, the transmission lines TX+ and TX−; and voltage dividers 46 and 48 for outputting voltage signals Vd+ and Vd− corresponding to the mirroring currents MxIRx+ and MxIrx− according to resistance ratio of resistors R0 and R1.

As noted before, in the conventional differential current driving type data transmission system, the transmission section 100 provides a common mode interval where the differential transmission lines TX+ and TX− are equalized at the same drive current level. In this case, since the differential transmission lines TX+ and TX− are connected by a switch, they are almost equally influenced by external noise or the interference between signal lines. Further, since the transition of the signal occurs at an intermediate level thereof, signal transition time is relatively shorter than the conventional driving type, thereby increasing the transmission rate.

In the conventional differential current driving type data transmission system, however, when the differential transmission lines TX+ and TX− are equalized at the same drive current level in the common mode interval, self-fluctuation occurs by the inductance component that is parasitic on the signal line itself, and such fluctuation can be readily changed into a differential voltage, which results in distortions in the transmission signal.

In addition, the I-V converting circuit of the receiving section 300 multiplies an applied current using the current mirror, and converts this multiplied current into a voltage. Unfortunately though, the fluctuation of the signal line itself sometimes causes an error during the current-to-voltage conversion. Moreover, it is another problem that the current mirror circuit alone consumes much current.

SUMMARY OF THE INVENTION

An embodiment of the present invention is directed to providing a differential current driving type data transmission system, which is capable of preventing the distortion phenomenon of a transmission signal caused by inductance parasitic on the transmission line when driving the common mode for differential signal lines.

Another embodiment of the present invention is to providing a differential current driving type data transmission system, which is capable of reducing the error rate during the I-V conversion at a receiving end and lowering the overall current consumption.

In accordance with an aspect of the invention, there is provided a differential current driving type data transmission system, including: a line drive controller for outputting differential transmission signals and common mode line control signals, in response to a transmission signal; current sources for generating an excitation current and a base current and for driving positive/negative transmission lines with the base current; a first switch for selectively switching the excitation current to the positive/negative transmission lines, in response to the differential transmission signals; and a second switch for equalizing the positive/negative transmission lines within a common mode interval, in response to the common mode line control signals, wherein, in the common mode, the positive negative transmission lines are driven at a level above or below an intermediate current level by a predetermined common mode current difference.

In accordance with another aspect of the invention, there is provided a differential current driving type data transmission system, including: a line drive controller for outputting differential transmission signals and common mode line control signals, in response to a transmission signal; current sources for generating an excitation current and a base current and for driving positive/negative transmission lines with the base current; a first switch for selectively switching the excitation current to the positive/negative transmission lines, in response to the differential transmission signals; a second switch for equalizing the positive/negative transmission lines within a common mode interval, in response to the common mode line control signals, a first diode-connected MOS transistor, whose gate takes a positive transmission current provided via a positive transmission line, for outputting a positive voltage signal corresponding to the positive transmission current; a second diode-connected MOS transistor, whose gate takes a negative transmission current provided via a negative transmission line, for outputting a negative voltage signal corresponding to the negative transmission current; and a comparator for comparing the positive/negative signals to recover an original signal.

In accordance with the present invention, the differential current driving type data transmission system having a common mode drive interval introduced to minimize the error rate during the recovery of an original signal at the receiving end without an increase in the transmission current is intentionally designed in consideration of the fluctuation by the inductance component of the signal line itself, such that there is a minimal difference in the current amount that flows through two signal lines in the common mode interval. One possible scheme to do so is raising the turn-on resistance of the equalizing switch in the line driver. Also, Unlike the related art technique where an applied current was multiplied using the current mirror and then converted back to a voltage at the receiving end, the present invention does not use any current mirror but a diode-connected transistor to readily convert current into voltage. The converted voltage is then applied to the comparator to recover a transmission signal. This I-V conversion scheme in accordance with the present invention can not only reduce the occurrence of errors caused by fluctuations in the signal line itself during the current-to-voltage conversion, but also lower the overall power consumption by not using the current mirror.

DESCRIPTION OF SPECIFIC EMBODIMENTS

Hereinafter, preferred embodiments in accordance with the present invention will be described in detail with reference to the accompanying drawings.

Figure 1:
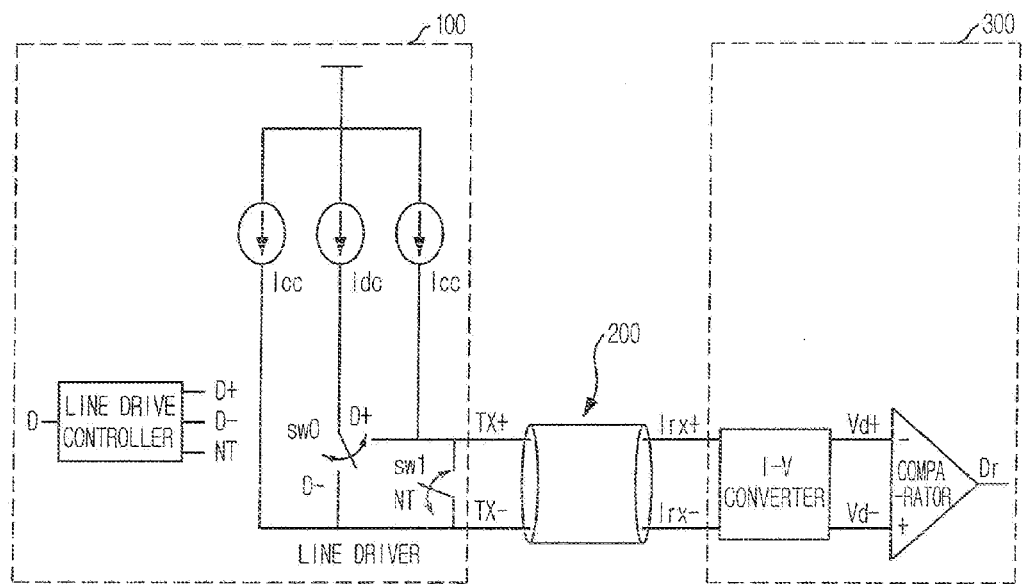
FIG. 1 is a block diagram showing a conventional differential current driving type data transmission system (Korean Patent Application No. 2005-34614).
Figure 2:
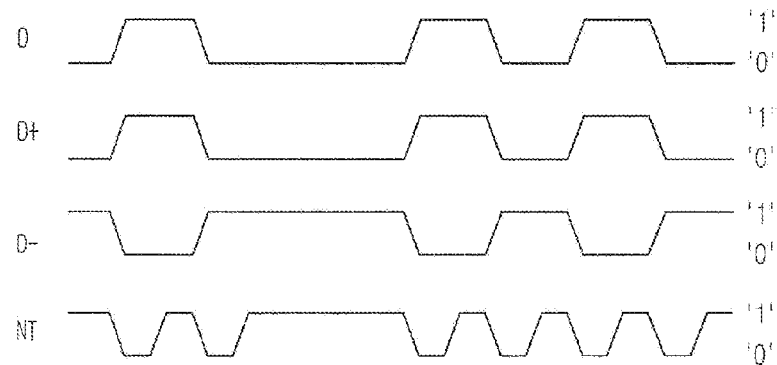
FIG. 2 is a timing diagram of signals used in the line drive controller of FIG. 1.

It is first assumed that a differential current driving type data transmission system in accordance with the present invention is basically carried out in a common mode, and therefore, one embodiment of the system described below basically has the same configuration as that of the line driver shown in FIG. 1 and FIG. 3 as noted before.

Figure 3:
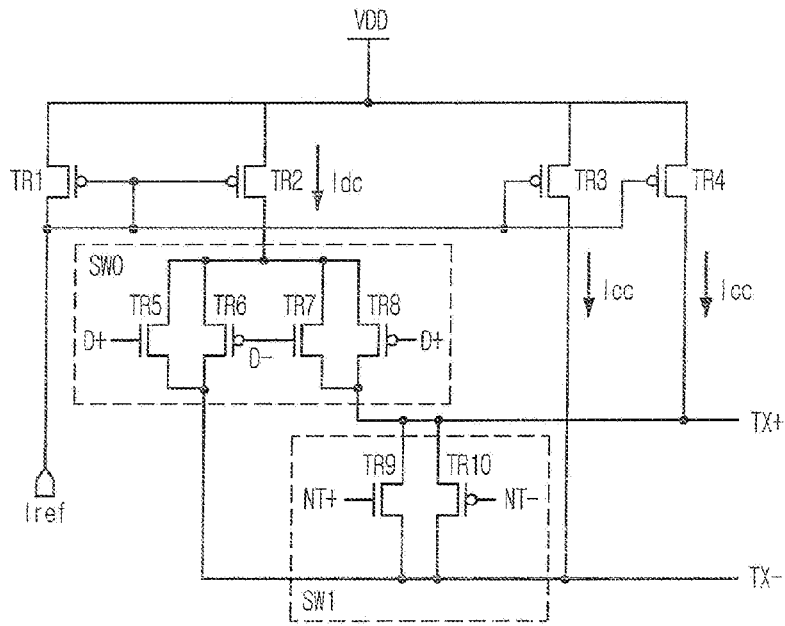
FIG. 3 is a circuit diagram of the line driver of FIG. 1.
Figure 4:
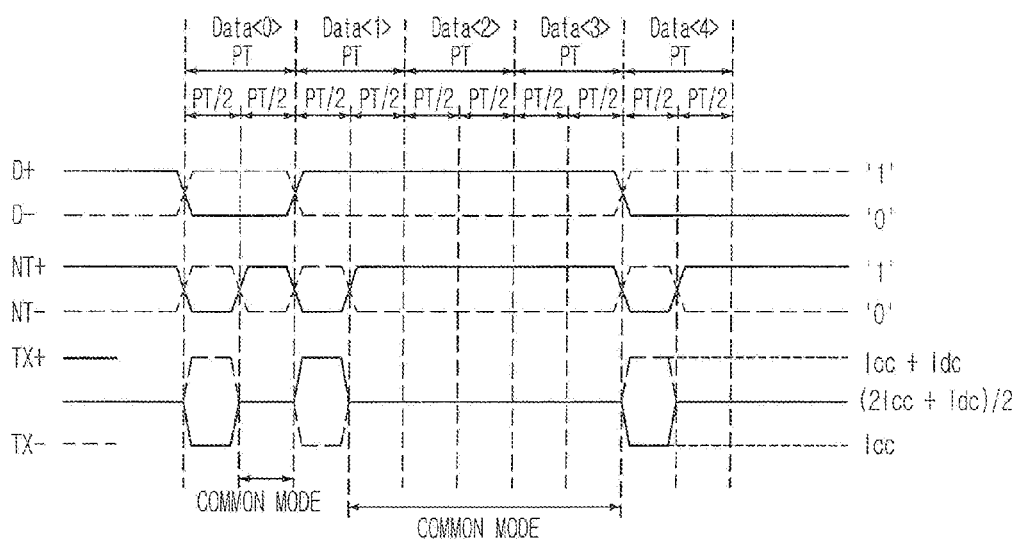
FIG. 4 is a timing diagram of signals used in the, line driver of FIG. 3.

That is to say, a line driver in accordance with one embodiment of the present invention includes current sources for generating an excitation current Idc and a base current Icc by mirroring a reference current Iref; a first switch SW0 for selectively switching the excitation current IDC to a differential transmission line TX+ or TX−, in response to different transmission signals D+ and D−; and a second switch SW1 for equalizing the differential transmission lines TX+ and TX− in a common mode interval, in response to line control signals NT+ and NT−, as shown in FIG. 3.

One differences however, is that the line driver in accordance with one embodiment of the present invention sets turn-on resistance of the second switch SW1 to a certain level or higher. When the second switch SW1 is turned on as entering the common mode, current is divided at the first and the second switches SW0 and SW1. If the turn-on resistance of the second switch SW1 is greater than a predetermined level, a corresponding line cannot be driven up to an intermediate current level but maintains ±Δ difference with the intermediate current level.

Figure 6:
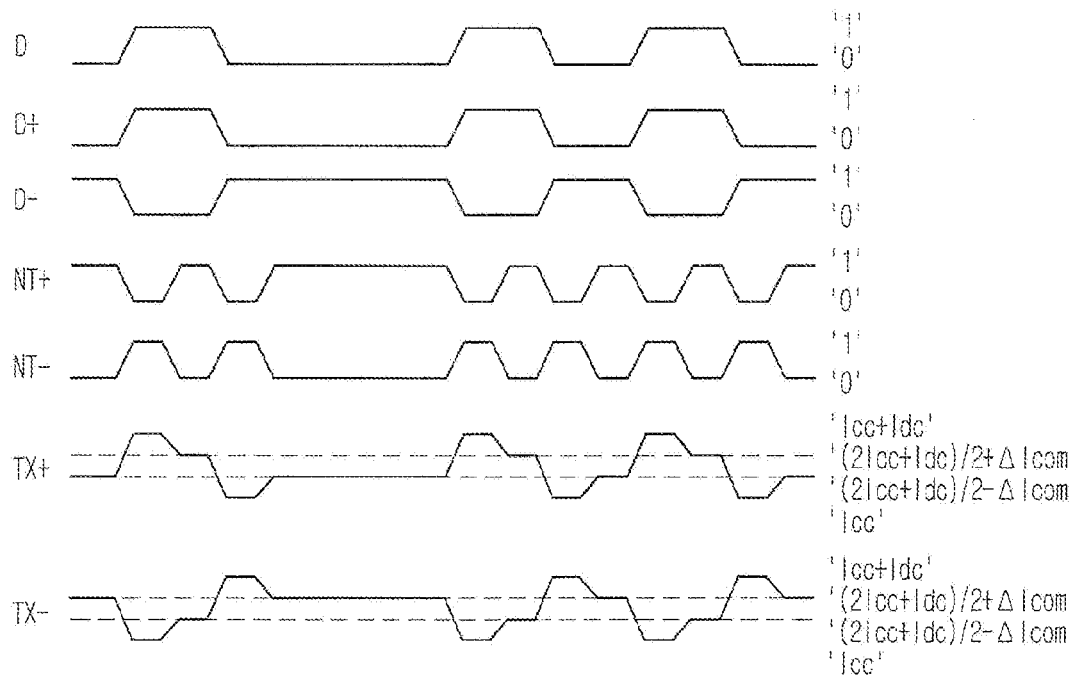
FIG. 6 is a timing diagram of signals used on a line driver in accordance with one embodiment of the present invention.

FIG. 6 is a timing diagram of signals used in the line driver in accordance with one embodiment of the present invention.

Referring to FIG. 6, when a transmission signal D transits to a logic high level, the first switch SW0 switches the excitation current Idc to the transmission line TX+, and the transmission line TX+ is eventually driven at an Icc+Idd level. At this time, the transmission line TX− is driven at an Icc level.

Meanwhile, when the second switch SW1 is turned on in response to a line control signal NT+ that was deactivated to a logic low level during a half period of the unit pulse width of the transmission signal D and then activated again to a logic high level at the transition point of the transmission signal D, until next transmission signal D is transitioned, the transmission line TX+ is driven at a level higher than an intermediate current level 2Icc+Idc/2 by a common mode current difference ΔIcom while the transmission line TX− is driven at a level lower than the intermediate current level 2Icc+Idc/2 by the common mode current difference ΔIcom.

When such a common mode is carried out, the polarity of the transmission signal does not readily change even though there may be fluctuations due to the parasitic inductance component in each of two transmission lines.

For information, the common mode current difference ΔIcom is not a definite value but a system-dependent variable value that should be applied differently to each system. That is to say, high common mode current difference ΔIcom is applied to a system with a large parasitic inductance of the transmission line alone, while low common mode current difference ΔIcom is applied to a system with a small parasitic inductance of the transmission line alone. Therefore, the common mode current difference ΔIcom can be determined through a verification procedure for a target system, and it is designed in a manner that the turn-on resistance of the second switch SW1 is set based on the determined common mode current difference ΔIcom.

Figure 7:
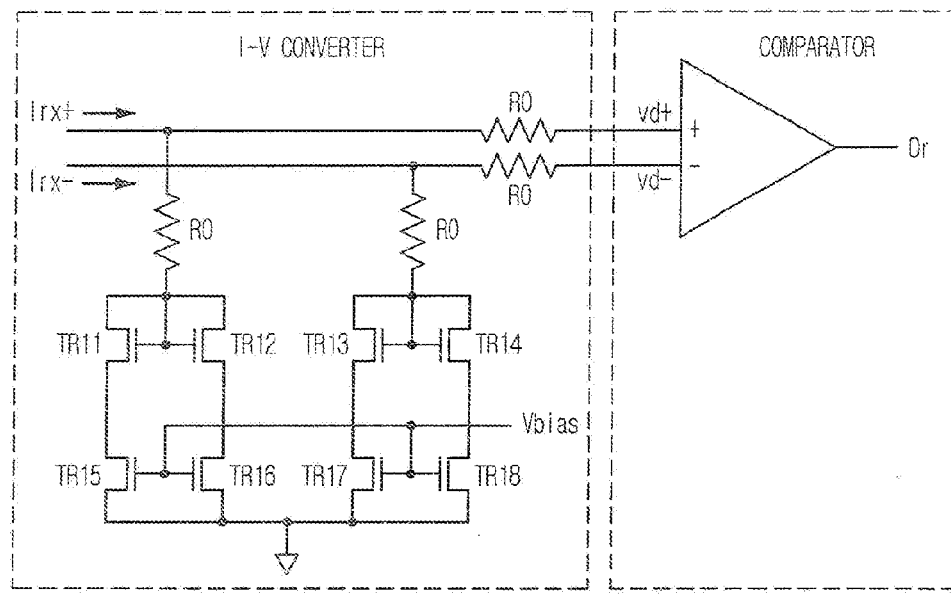
FIG. 7 is a circuit diagram of a receiving section in accordance with one embodiment of the present invention.

FIG. 7 is a circuit diagram of a receiving section in accordance with one embodiment of the present invention.

Referring to FIG. 7, the receiving section in accordance with one embodiment of the present invention includes an I-V converter for converting transmission currents Irx+ and Irx− that have been transmitted via transmission lines into voltage signals Vd+ and Vd−; and a comparator for comparing the voltage signals Vd+ and Vd− to recover an original signal Dr therefrom. This receiving scheme for recovering an original signal D through the I-V converter and the comparator is similar to that of the related art.

One difference, however, is that the I-V converter of this embodiment employs diode-connected MOS transistors TR11, TR12, TR13, and TR14, instead of a current mirror.

In other words, the transmission currents, Irx+ and, Irx− being transmitted via transmission lines are applied to the diode-connected MOS transistors TR11, TR12, TR13, and TR14 to create a voltage difference in voltage signals Vd+ and Vd− that are inputted to the comparator based on an amount of current transmitted, and also create a common level voltage for the comparator to be able to operate.

Meanwhile, transistors TR15, TR16, TR17, and TR18, to which a bias voltage Vbias is applied, sink a certain bias current to ground, such that the transmission currents Irx+ and Irx− can be received more easily via the transmission lines. And a resistor R0 is provided to protect against electrostatic discharge ESD.

Figure 5:
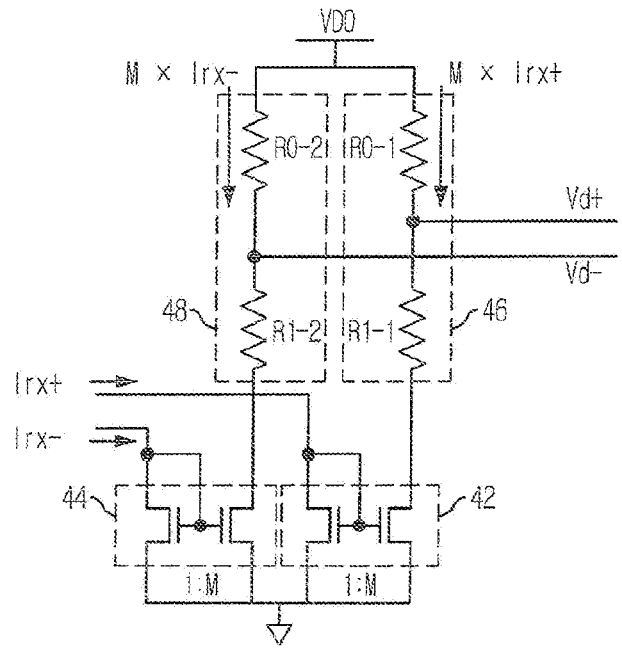
FIG. 5 is a circuit diagram of the I-V converter in FIG. 1.
Figure 8:
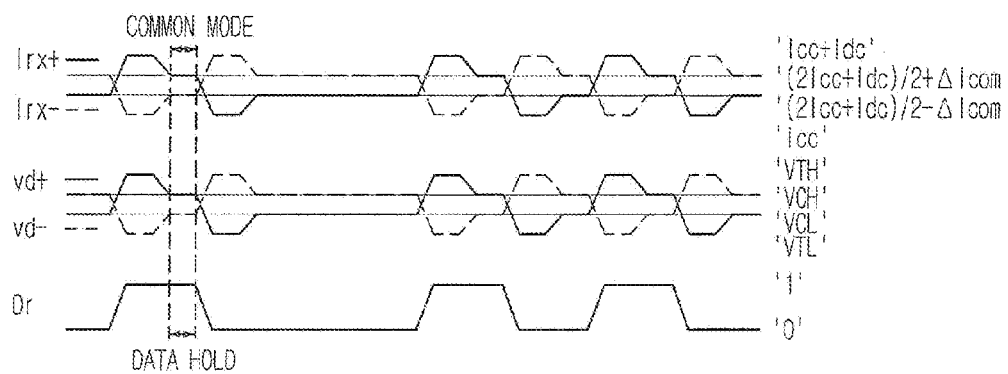
FIG. 8 is a timing diagram of signals used in the receiving section in FIG. 5.

FIG. 8 is a timing diagram of signals used in the receiving section in FIG. 5.

Referring to FIG. 8, the transmission currents Irx+ and Irx− provided via the transmission lines are converted, by the diode-connected transistors of the I-V converter, into voltage signals Vd+ and Vd−. Then, the comparator detects a voltage difference between the voltage signals Vd+ and Vd− to recover an original signal Dr.

In particular, in the common mode interval, the transmission currents Irx+ and Irx− being transmitted in this way are different from each other by ±ΔIcom. At this time, the comparator exhibits a data hold interval holding previous signals. Since the recovered original signal Dr does not experience transition within this data hold inverter, the comparator can recover an original signal Dr having a pulse width of the complete unit pulse width.

The I-V converter in accordance with this embodiment outputs voltage signals Vd+ and Vd− in four levels VTH, VCH, VCL, and VTL, depending on each current level. Here, VTH is a converted voltage when the transmission current has a maximum level Icc+Idc. In detail, the voltage at this time corresponds to a sum of Vds_sat_tr16 (the voltage across drain and source in a saturation region of TR16 during the operation), Vgs_tr1. (the voltage across gate and source of TR11 when the current Icc+Idc flows therein), and Irx·R0 (the voltage applied to R0). VTL is a converted voltage when the transmission current has a minimum level Icc. In detail, the voltage at this time corresponds to a sum of Vds_sat_tr16, Vgs_tr11 (the voltage across gate and source of TR11 when the current Icc flows therein), and Irx·R0. VCH is a converted voltage when a large current out of the transmission currents in the common mode is transmitted. That is, it corresponds to Vds_sat_tr16+Vgs_tr11+Irx·R0, if Irx=(2Icc+Idc)/2+ΔIcom. Lastly, VCL is a converted voltage when a large current out of the transmission currents in the common mode is transmitted. That is, it corresponds to Vds_sat_tr16+Vgs_tr11+Irxe R0, if Irx =(2Icc+Idc)/2−ΔIcom.

Figure 9:
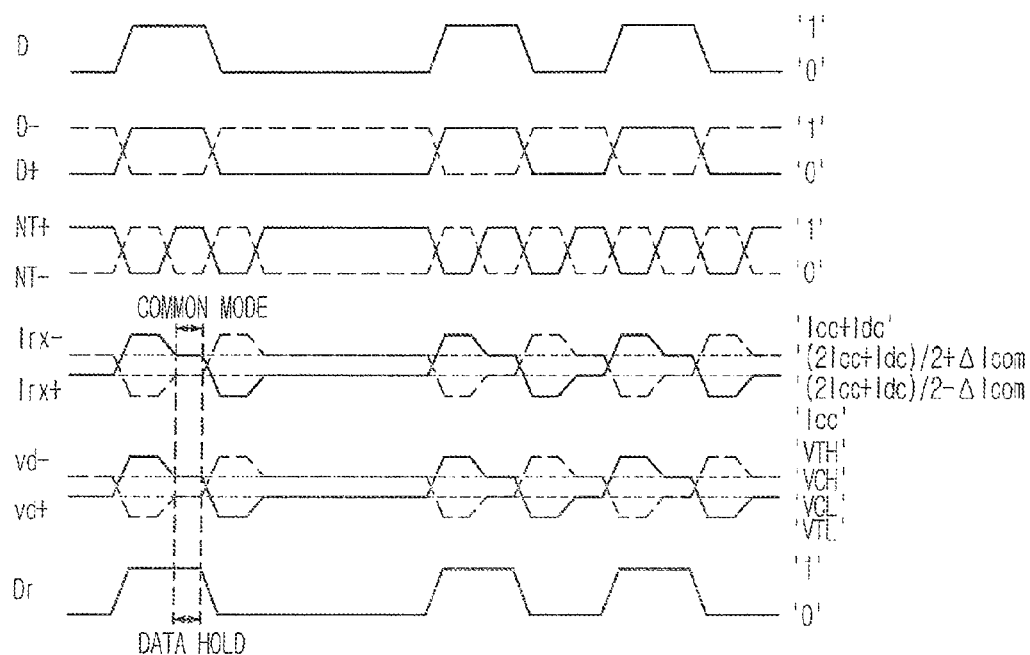
FIG. 9 is a timing diagram of transmission signals used in a differential current driving type data transmission system including both a transmission section and a receiving section, in accordance with the present invention.

FIG. 9 is a timing diagram of signals used in a differential current driving type data transmission system including a transmission section and a receiving section, in accordance with the present invention. The waveforms in the drawing are simply the collection of ones discussed earlier, so explanations on them will be omitted here.

Figure 10:
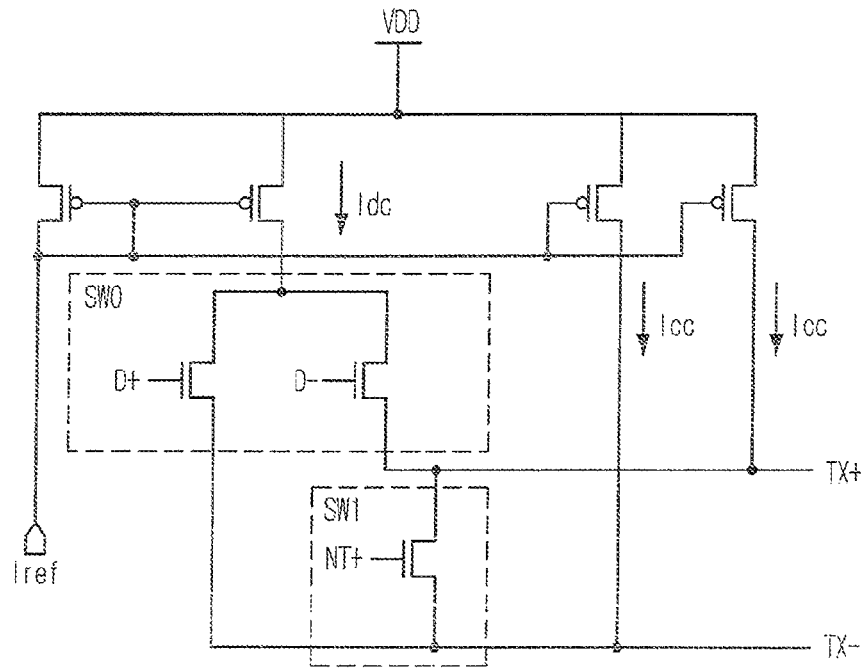
FIG. 10 illustrates an exemplary configuration of the line driver in FIG. 6, in which first and second switches SW0 and SW1 are embodied by NMOS transistors only.

While the present invention has been described With respect to the particular embodiment which implements a switch by transmission gates, the present invention is not limited thereto but may also use another switching element such as a single MOS transistor. FIG. 10 illustrates an exemplary configuration of the line driver in FIG. 6, in which first and second switches SW0 and SW1 are embodied by NMOS transistors only.

Figure 11:
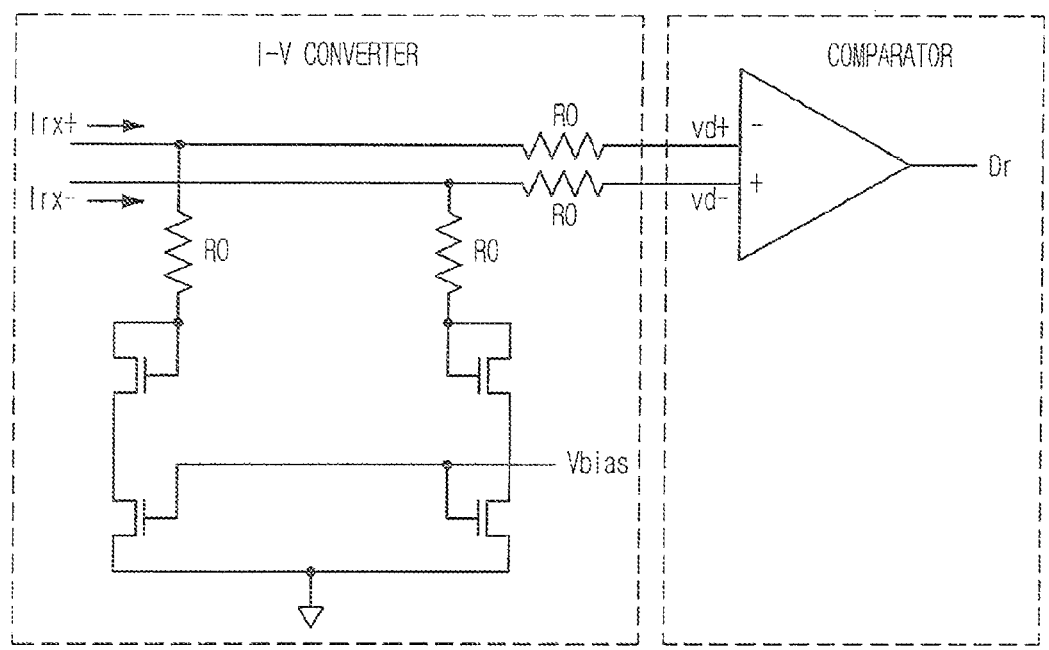
FIG. 11 illustrates an exemplary configuration of the I-V converter in FIG. 7, in which a bias transistor and a diode-connected NMOS transistor are embodied by a single NMOS transistor.

Moreover, while the present invention has been described with respect to the particular embodiment which implements an I-V converter by a bias transistor and a diode-connected NMOS transistor in a pair, the present invention is not limited thereto. FIG. 11 illustrates an exemplary configuration of the I-V converter in FIG. 7, in which a bias transistor and a diode-connected NMOS transistor are embodied by a single NMOS transistor. Needless to say, instead of biasing of a NMOS current-sink transistor, biasing of a PMOS current-source transistor may also be applied.

As described above, the differential current driving type data transmission system in accordance with the present invention is capable of prevent distortions in a transmission signal without increasing the amount of drive current, and is particularly advantageous for reducing the error rate and the current consumption at a receiving section.

While the present invention has been described with respect to the specific embodiments, it will be apparent to those skilled in the art that various changes and modifications may be made without departing from the spirit and scope of the invention as defined in the following claims.

What is claimed is:

1. A differential current driving type data transmission system, comprising:
    a line drive controller for outputting differential transmission signals and common mode line control signals, in response to a transmission signal;
    current sources for generating an excitation current and a base current and for driving a positive transmission line and a negative transmission line with the base current;
    a first switch for selectively switching the excitation current to the positive or negative transmission lines, in response to the differential transmission signals; and
    a second switch for establishing a current path between the positive and negative transmission lines during a common mode interval, in response to the common mode line control signals,
    wherein, during the common mode interval, the positive and negative transmission lines are each driven at a level above or below an intermediate current level by a predetermined common mode current difference such that a first current level at which the positive transmission line is driven is different from a second current level at which the negative transmission line is driven.

2. The system of claim 1, wherein a turn-on resistance value of the second switch is adjusted so as to set each of the first and second current levels to be separated from the intermediate current level by the predetermined common mode current difference.

3. A differential current driving type data transmission system, comprising:
    a line drive controller for outputting differential transmission signals and common mode line control signals, in response to a transmission signal;
    current sources for generating an excitation current and a base current and for driving a positive transmission line and a negative transmission line with the base current;
    a first switch for selectively switching the excitation current to the positive and negative transmission lines, in response to the differential transmission signals;
    a second switch for establishing a current path between the positive and negative transmission lines during a common mode interval, in response to the common mode line control signals, such that, during the common mode interval, a positive current level at which the positive transmission line is driven is different from a negative current level at which the negative transmission line is driven;
    a first diode-connected MOS transistor, whose gate takes a positive transmission current provided via the positive transmission line, for outputting a positive voltage signal corresponding to the positive transmission current;
    a second diode-connected MOS transistor, whose gate takes a negative transmission current provided via the negative transmission line, for outputting a negative voltage signal corresponding to the negative transmission current; and
    a comparator for comparing the positive voltage signal with the negative voltage signal to recover an original signal.

4. The system of claim 3, wherein a turn-on resistance value of the second switch is adjusted so as to set each of the first and second current levels to be separated from an intermediate current level by a predetermined common mode current difference.

5. The system of claim 3, further comprising:
    a biasing means for supplying a bias current to current pathways of the first and the second diode-connected MOS transistors, in response to a bias voltage.

6. The system of claim 5, further comprising:
    first and second resistors, connected between the positive and negative transmission lines and the first and the second diode-connected MOS transistors, respectively, for protection against electrostatic discharge.

7. A data transmission system, comprising:
    a data driver configured to drive a pair of transmission lines with differential current signals having two of at least four possible current levels, the at least four possible current levels including a high level, a low level lower than the high level and two intermediate levels each higher than the low level and lower than the high level, the two intermediate levels being different from each other; and
    a data receiver configured to receive the differential current signals through the pair of transmission lines and to convert the received differential current signals into a voltage signal based on the current levels of the received differential current signals.

8. The data transmission system of claim 7, wherein the data receiver comprises a diode-connected MOS transistor that receives current from at least one of the pair of transmission lines and that converts the received current into voltage.

9. The data transmission system of claim 7, wherein the data receiver is configured to convert the received differential current signals into the voltage signal in such a manner that, during when the received differential current signals have the two intermediate levels, the voltage signal is maintained unchanged from a voltage level prior to receiving the differential current signals having the two intermediate levels.

* * * * *